UNITED STATES PATENT OFFICE.

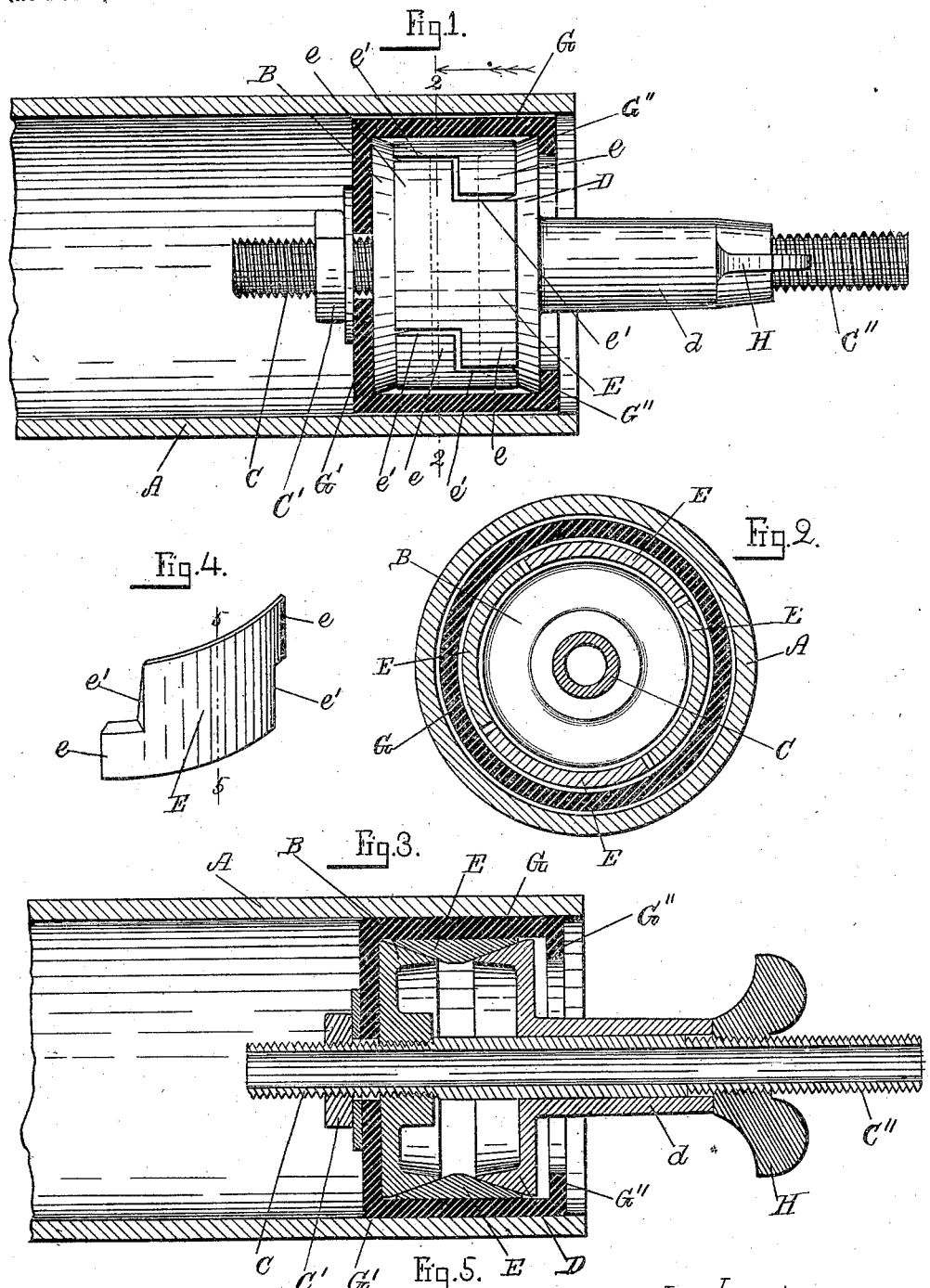

JOSEPH FLYNN, OF BOSTON, MASSACHUSETTS.

PLUMBER'S TESTING-PLUG.

SPECIFICATION forming part of Letters Patent No. 705,059, dated July 22, 1902.

Application filed October 1, 1901. Serial No. 77,203. (No model.)

*To all whom it may concern:*

Be it known that I, JOSEPH FLYNN, a citizen of Great Britain, residing at Boston, in the county of Suffolk and State of Massachusetts, have invented new and useful Improvements in Plumbers' Testing-Plugs, of which the following is a specification.

This invention relates to improvements in plumbers' testing-plugs for the purpose of testing sewer-pipes, drain-pipes, &c., in buildings, so as to ascertain whether or not any leakage exists in the system of piping, and it is carried out as follows, reference being had to the accompanying drawings, wherein—

Figure 1 represents a side elevation of the improved testing-plug, showing it in its contracted position and showing the expansive rubber cylinder and drain or sewer pipe in section. Fig. 2 represents a cross-section on the line 2 2 shown in Fig. 1. Fig. 3 represents a central longitudinal section of the device, showing the plug and its rubber cylinder expanded within the drain or sewer pipe during the testing operation. Fig. 4 represents a detail perspective view of one of the expansive duplex wedge-sections arranged within the expansive rubber cylinder, and Fig. 5 represents a cross-section on the line 5 5 shown in Fig. 4.

Similar letters refer to similar parts wherever they occur on the different parts of the drawings.

A represents the drain or sewer pipe desired to be tested.

The improved testing-plug consists of a tapering annular disk B, which is secured to a preferably tubular spindle C, on which is longitudinally adjustable a similar tapering annular disk D, provided with a sleeve $d$, longitudinally movable with the disk D on the said spindle C, as shown.

E E E E are a series of duplex tapering interlocking segmental plates engaging the tapering disks B D, as shown. One of such segmental plates E is provided, preferably, in one end with a projection $e$, adapted to interlock with a corresponding recess or cut-away portion $e'$ in the adjacent plate, as shown in Figs. 1 and 4.

The expansive plates E E E E and disks B D are arranged within a yielding rubber cylinder G, having a closed end $G'$, which is secured to the spindle C and disk B, preferably by means of a nut $C'$, as shown in Figs. 1 and 3. The opposite end of the expansive rubber cylinder G is provided with an inwardly-projecting annular flange or lip $G''$ for preventing the adjustable disk D from being withdrawn from within the expansive yielding cylinder G, as shown in Figs. 1 and 3.

The outer end of the spindle C is screw-threaded, as shown at $C''$, and onto it is screwed an adjustable thumb-nut H, the inner end of which bears against the outer end of the sleeve $d$, as shown.

In using the device the thumb-nut H is partially unscrewed from the spindle C, as shown in Fig. 1, which allows of the contraction of the elastic rubber cylinder G and consequent inward movement of the interlocking plates E E E E when the disk D is moved outward or away from the stationary disk B, which may be accomplished simply by taking hold of the sleeve $d$ and pulling it outward to the position shown in Fig. 1. The device is then introduced into the drain or sewer pipe A to be tested, as represented in said Fig. 1. By tightening the nut H the disk D is caused to be moved toward the disk B, and during such adjustment of said disk D the segmental tapering plates E E E E are caused to be expanded, and thereby causing the rubber cylinder to be expanded and forced air and water tight against the inner surface of the drain or sewer pipe A, as shown in Fig. 3, thus effectually closing the end of said pipe A, after which the condition of the latter is to be tested in the usual manner either by forcing water under pressure through the hollow spindle C, or, if the latter should be made solid, the liquid under pressure may be forced into the pipe system at any desirable place thereon.

What I wish to secure by Letters Patent and claim is—

The herein-described plumber's testing-plug, consisting in combination, an expansive rubber cylinder G, having in one end a closed portion $G'$, and an annular lip $G''$, in its opposite end, and an expanding device arranged within said rubber cylinder consisting of a tapering disk B, a spindle C, and rubber cylinder G, a longitudinally-adjustable tapering disk D, a series of interlocking duplex tapering segmental plates E, E, E, E, and means for expanding the latter and the rubber cylinder so as to force the said rubber cylinder against the interior of the pipe to be tested, substantially as and for the purpose set forth.

In testimony whereof I have hereunto set my hand in presence of two subscribing witnesses.

JOSEPH FLYNN.

Witnesses:
ALBAN ANDRÉN,
ROBERT H. O. SCHULZ.